United States Patent [19]

Pinede et al.

[11] Patent Number: 4,591,671

[45] Date of Patent: May 27, 1986

[54] TELEPHONE HAVING BUILT-IN TEST CAPABILITY FOR USE IN KEY TELEPHONE SYSTEM

[75] Inventors: Edouard Pinede, Norwalk; Serge Faublas, Monroe, both of Conn.

[73] Assignee: PKS/Communications, Inc., Milford, Conn.

[21] Appl. No.: 616,565

[22] Filed: May 31, 1984

[51] Int. Cl.⁴ .............................................. H04M 1/24
[52] U.S. Cl. .......................... 179/175.2 R; 179/99 R; 179/99 LS; 179/81 R; 179/81 B
[58] Field of Search ................. 179/175.2 R, 175.2 A, 179/175.2 C, 175.2 D, 175.2 B, 175.1, 175.1 R, 99 R, 99 A, 99 H, 99 LC, 99 LS, 99 M, 99 P, 81 R, 81 C, 81 B, 84 L, 84 VF, 90 K, 18 B, 100 R, 100 D

[56] References Cited

U.S. PATENT DOCUMENTS

| | | | |
|---|---|---|---|
| 3,856,996 | 12/1974 | Greenberg | 179/175 |
| 3,912,881 | 10/1975 | Rigazio et al. | 179/175.2 R |
| 3,971,898 | 7/1976 | Hijikata et al. | 179/99 |
| 4,112,261 | 9/1978 | Shiff | 179/99 M |
| 4,203,011 | 5/1980 | Coviello | 179/99 M |
| 4,214,132 | 7/1980 | Kelso | 179/175 |
| 4,298,775 | 11/1981 | Buck et al. | 179/81 R |
| 4,301,335 | 11/1981 | Jucker et al. | 179/84 L |
| 4,338,495 | 7/1982 | Bloch et al. | 179/99 M |
| 4,374,308 | 2/1983 | Holesha | 179/99 LS |
| 4,383,137 | 5/1983 | Aikawa et al. | 179/18 ES |
| 4,389,547 | 6/1983 | Jansen et al. | 179/81 R |
| 4,399,333 | 8/1983 | Gewitz et al. | 179/175.3 F |
| 4,415,778 | 11/1983 | Turner | 179/175.1 R |
| 4,453,040 | 6/1984 | Wolf et al. | 179/81 C |

FOREIGN PATENT DOCUMENTS 0012102  6/1980  European Pat. Off. ......... 179/6.3 R

OTHER PUBLICATIONS

Hayes, J., *Western Electric Technical Digest*, No. 58, Apr., 1980, pp. 19–21, "Testing the Sequence of Operation of Switch Contacts".

Webb et al., Conf. on Comm. Equip. and Systems, Birmingham, England, Apr. 16–18, 1980, "A Computer-Based System for the Design, Measurement and Assessment of Telephone Sets".

*Primary Examiner*—Gene Z. Rubinson
*Assistant Examiner*—Elio DiVito
*Attorney, Agent, or Firm*—Kramer and Brufsky

[57] ABSTRACT

A telephone, for use in a key telephone system, has built-in test capability for verifying the operation of components in the telephone. The test capability is such that a relatively unsophisticated user can step through and conduct each of a plurality of separate tests. Interface to the tests is provided through the same switches and indicators on the telephone used for normal telephone operation. Status of certain test routines and components being tested is indicated, during the test mode of operation, on the telephone's regular indicator lamps.

23 Claims, 12 Drawing Figures

TEST 4 - HANDS FREE SPEAKER

TEST 5 - HANDSET MICROPHONE

TEST 6 HANDS FREE MICROPHONE

TEST-7- NOISE AND LOOPBACK

TELEPHONE HAVING BUILT-IN TEST CAPABILITY FOR USE IN KEY TELEPHONE SYSTEM

BACKGROUND OF THE INVENTION

The present invention relates to key telephone systems and more particularly to a telephone having built-in test capability for use in such a system. The telephone of the present invention includes a microprocessor which can be placed into a test mode for verifying the proper operation of the components of the telephone.

Key telephone systems generally comprise a plurality of telephone stations (referred to herein as "telephones") and a central key service unit ("KSU") which interconnects the telephones with each other and to outside telephone trunk lines. The KSU provides control functions for the key telephone system and establishes communication paths between telephones. When outside calls are involved, the KSU establishes communication paths between telephones and telephone trunk lines.

Each telephone in a key telephone system must be connected to the KSU in order to function. Such telephones would not operate if plugged directly into a telephone line. An example of a key telephone system with which such phones are used is provided in commonly assigned co-pending U.S. patent application Ser. No. 616,566 filed May 31, 1984, entitled "Key Telephone System", pertinent portions of which are incorporated herein by reference.

In past key telephone systems, telephones which were believed to be in need for repair were disconnected from the system and returned to a central repair facility which would determine if the telephone was, in fact, broken. Many times, telephones returned to the central repair facility were fine, the problem being at the KSU end of the system from which the telephone came. Also, in manufacturing such telephones an expensive test jig is necessary to verify proper operation of the telephone after assembly thereof. A similar test jig is required by field repairmen to verify proper operation of the telephones in the field. The lack of a convenient means to test telephones, and the inability of a telephone owner and/or user to test his own phone has been a tremendous disadvantage in maintaining the reliability and overall performance of key telephone systems.

It would be advantageous to provide telephones for a key telephone system wherein each telephone has a built-in testing capability. Such capability should be easy to access by a designated user or users of the key telephone system. Once accessed, it should be easy to perform the tests provided to determine whether the components of the telephone are operating properly. Components which would be advantageous to test include the indicator lamps on the telephone, the telephone key pad, all other switches on the telephone, the telephone earphone and microphone, and, if provided, the handsfree speaker and hands-free microphone of the telephone. It would be further advantageous to provide a test for measuring the noise characteristics of the telephone audio circuitry.

The present invention provides such a telephone. A microprocessor within the telephone can be placed into a test mode of operation, during which a plurality of tests can be stepped through and conducted on the telephone to determine if components of the telephone are operating properly.

SUMMARY OF THE INVENTION

In accordance with the present invention, a telephone having built-in test capability is provided for use in a key telephone system. The telephone comprises a telephone housing, a microprocessor mounted in the housing, and a plurality of switches mounted to the housing and coupled to the microprocessor for placing calls and implementing features associated with the key telephone system. A plurality of indicator lamps is mounted to the housing and coupled to the microprocessor, each lamp associated with one of the switches. The indicator lamps can, for example, be light emitting diodes ("LED"s). Means coupled to the microprocessor are provided for placing the telephone into a test mode of operation. Further, means operatively associated with the microprocessor and responsive to the switches during the self-test mode are provided for stepping through and conducting a plurality of telephone tests to determine if components of the telephone are operating properly.

Among the plurality of telephone tests which are provided in accordance with the invention are an indicator lamp test, a key test, an earphone test, a microphone test, a hands-free speaker test, a hands-free microphone test, and a noise test. In the indicator lamp test, means associated with the microprocessor is provided for turning on lamps in response to actuations of the telephone switches. In the key test, the proper operation of each of the switches is verified by means associated with the microprocessor for driving a group of the indicator lamps to display a unique multi-bit digital code upon actuation of each different switch. The display of a proper multi-bit code upon actuation of a switch indicates that the switch is operating properly.

In the earphone test, means is provided for generating an audible signal, such as a fixed frequency tone, busy signal, or ring signal, together with means for coupling the audible signal to the earphone. The output of the audible signal from the earphone indicates that the earphone is operating properly.

In conjunction with the microphone test, means is provided (e.g., in the KSU) for coupling an audio output from the microphone to the earphone. Reproduction of the audio output from the earphone indicates proper operation of the microphone. The hands-free speaker and hands-free microphone tests operate in a similar manner to the earphone and microphone tests described above. The noise test determines the audio quality of the telephone. In this connection, means is provided for coupling the output of the hands-free microphone to the inputs of the earphone and speaker during the noise test. A noise measurement can be made at the earphone and speaker to ascertain the noise inherent in the telephone's audio processing circuitry.

BRIEF DESCRIPTION OF THE DRAWINGS

FIG. 3 is a flow chart of the main loop in the test program of the telephone;

FIG. 4 is a flow chart of the LED TEST (test 1) routine which can be called by the main loop;

DETAILED DESCRIPTION OF A PREFERRED EMBODIMENT

Figure 1:
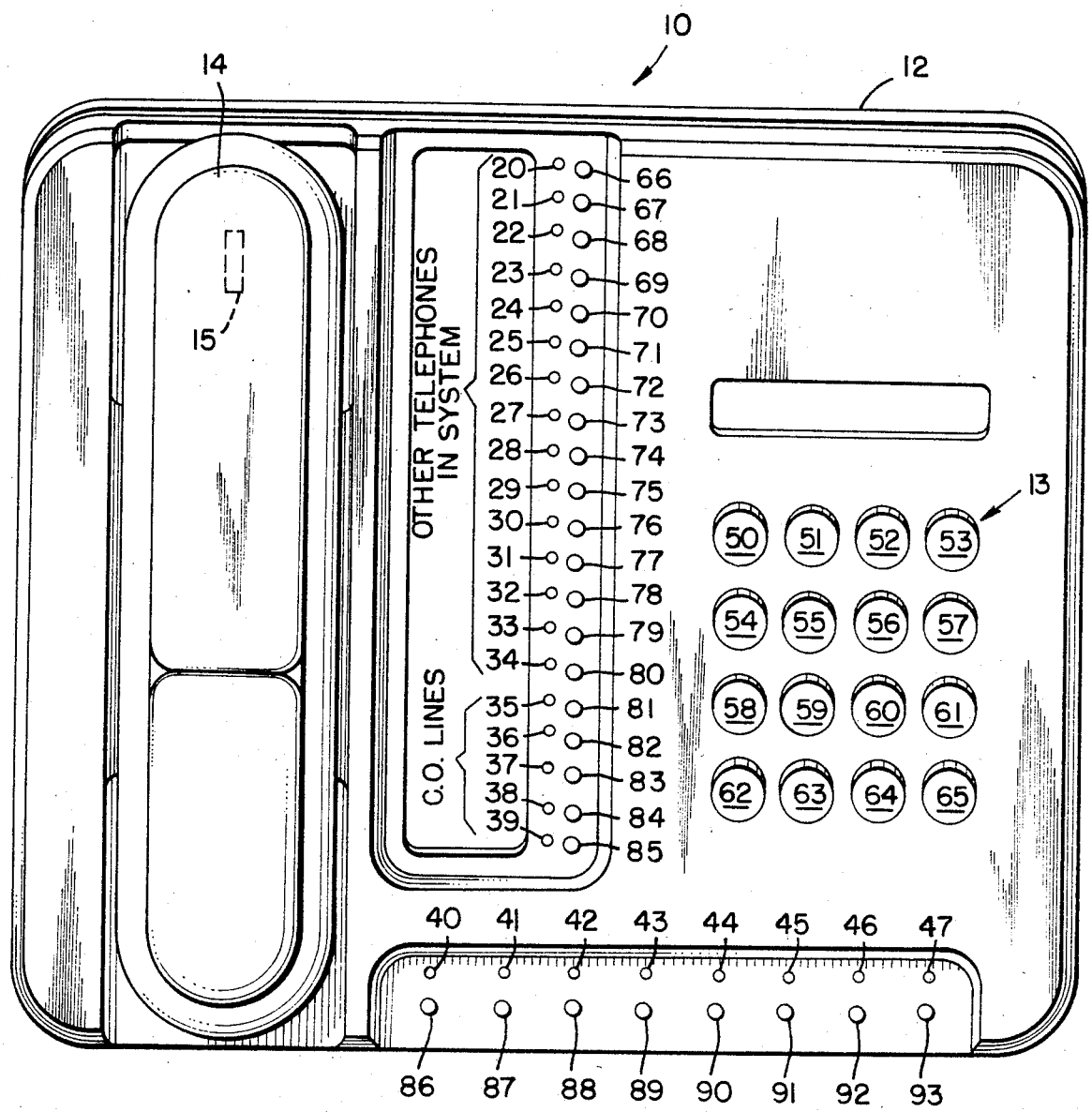
FIG. 1 is a top plan view of a telephone in accordance with the present invention, showing the various switches and indicator lamps thereon.

Turning now to the Figures, FIG. 1 shows a telephone 10 in accordance with the present invention. Telephone 10 includes a telephone housing 12 which is adapted to hold a telephone handset 14. Handset 14, when placed in housing 12, actuates a hook switch 15 in a conventional manner. A keyboard, generally designated 13, includes keyswitches 50 to 65. A plurality of switches 66 to 93 are used to place calls to other telephones within the key telephone system to which telephone 10 is connected, to seize central office trunk lines for outside calls, and to implement various functions available in the key telephone system. Together, switches 50 through 93 are used for placing calls and implementing features associated with the key telephone system.

A plurality of indicator lamps, or LEDs 20 to 47 are mounted to housing 12. Each lamp 20 to 47 is associated with one of the switches 66 to 93. In normal operation of the telephone, when one of switches 66 to 93 is actuated, the corresponding indicator lamp will light. Thus, for example, when switch 66 is actuated, indicator lamp 20 will light. The indicator lamps will also light when a telephone in the key system associated with the light is in use, when a central office trunk line associated with an indicator lamp is in use, or when a system feature associated with a lamp has been selected.

In one embodiment, the telephone of FIG. 1 is used in a key telephone system having a total of 16 telephones. Switches 66 to 80 are each used to call one of the other 15 telephones in the key telephone system. Associated indicator lamps 20 to 34 each indicate when the other telephone in the system associated therewith is in use. Thus, for example, if indicator lamp 20 is lit, the user of telephone 10 will know that the telephone station associated with lamp 20 is already in use. In such an instance, the user of telephone 10 would not normally attempt to call the other telephone station by actuating switch 66. If, on the other hand, lamp 20 were off, the user of telephone 10 would know that the other telephone associated therewith is free to be called, and could call that telephone by actuating switch 66. Actuation of switch 66 would cause indicator lamp 20 on telephone 10 to light.

In the embodiment under discussion, switches 81 to 85, and indicator lamps 35 to 39 are each associated with one of five central office ("C.O.") trunk lines available in the key telephone system. If it were desired to place an outside call, the user of telephone 10 would select a C.O. line for which the associated indicator lamp is not lit, and press the corresponding switch to seize that central office line for his own use. Thus, if indicator lamp 35 is off, the user of telephone 10 would know that the corresponding central office line is free, and could select the line by depressing switch 81. A dial tone would then be heard on handset 14, and the user could place the outside call by dialing the telephone number on keyboard 13.

Switches 86 to 93 and associated indicator lamps 40 to 47 are used to implement special features associated with the key telephone system. For example, switch 86 and indicator lamp 40 could be used to place a call on hold, or to cause a message waiting lamp on another telephone called, but not answered, to flash. Switch 87 and associated indicator lamp 41 could be used for call splitting, enabling a telephone to flip-flop between two calls by depressing the switch. Switch 88 and associated indicator lamp 42 could be used to provide a call transfer feature. Switch 87 and associated lamp 43 could be used to turn a hands-free microphone in telephone 10 on or off. Switch 90 and associated indicator lamp 44 could be used to provide a do not disturb and/or microphone mute feature. Switch 91 and associated indicator lamp 45 could be used to provide a page function, enabling the user of telephone 10 to make a page announcement. Switch 92 and associated indicator lamp 46 could be used to provide for conference calls, and switch 93 and associated indicator lamp 47 could be used to provide a call back feature.

Some or all of keyboard switches 50 to 65 could be provided with dual functions. For example, the main function of a key may be a digit for use in dialing a telephone number. An auxiliary function could be accessed by pressing a sequence of keys, such as a feature key and then a digit key for the specific function desired.

Figure 2A:
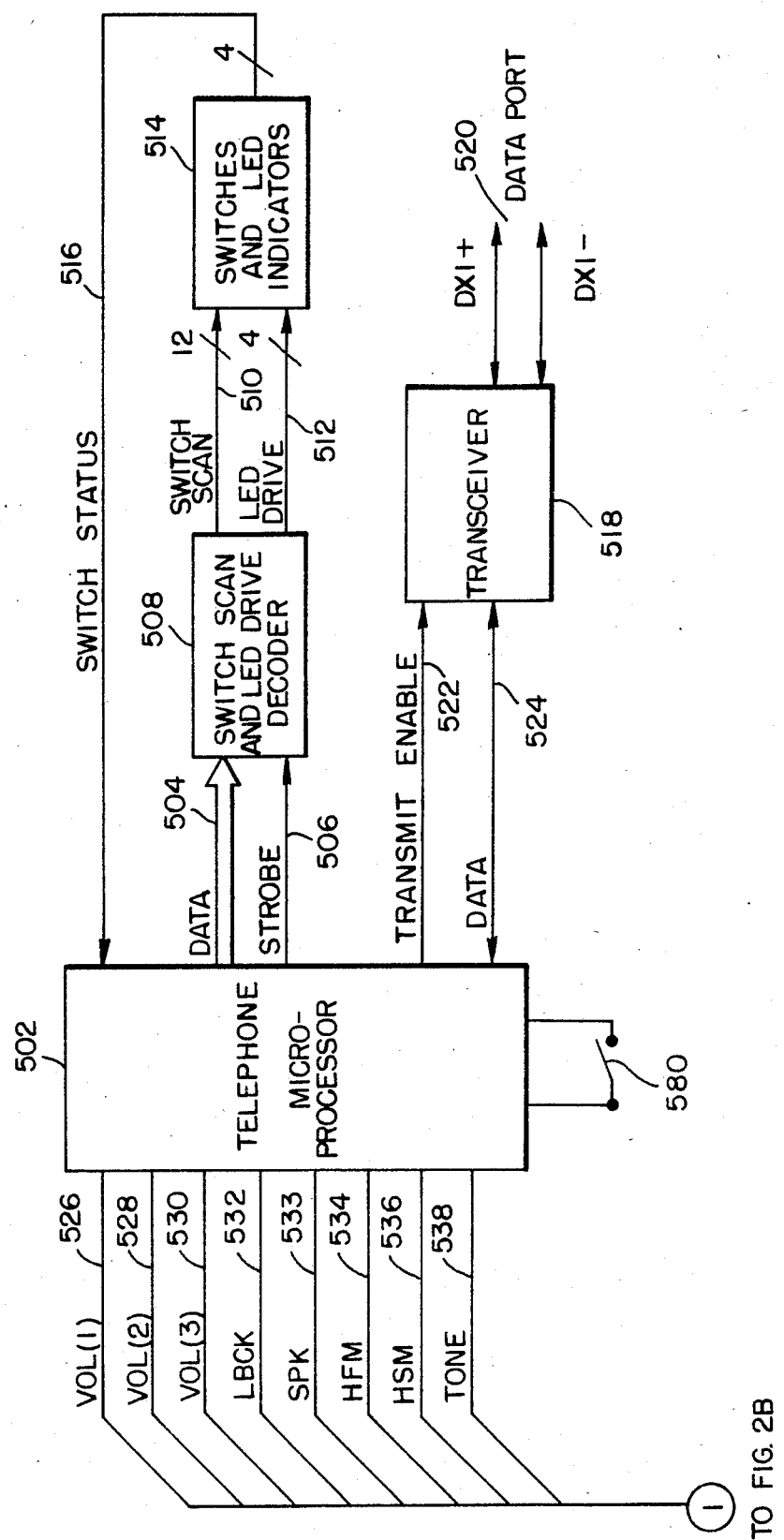
FIG. 2A is a block diagram of the data communication circuitry within a telephone in accordance with the present invention.
Figure 2B:
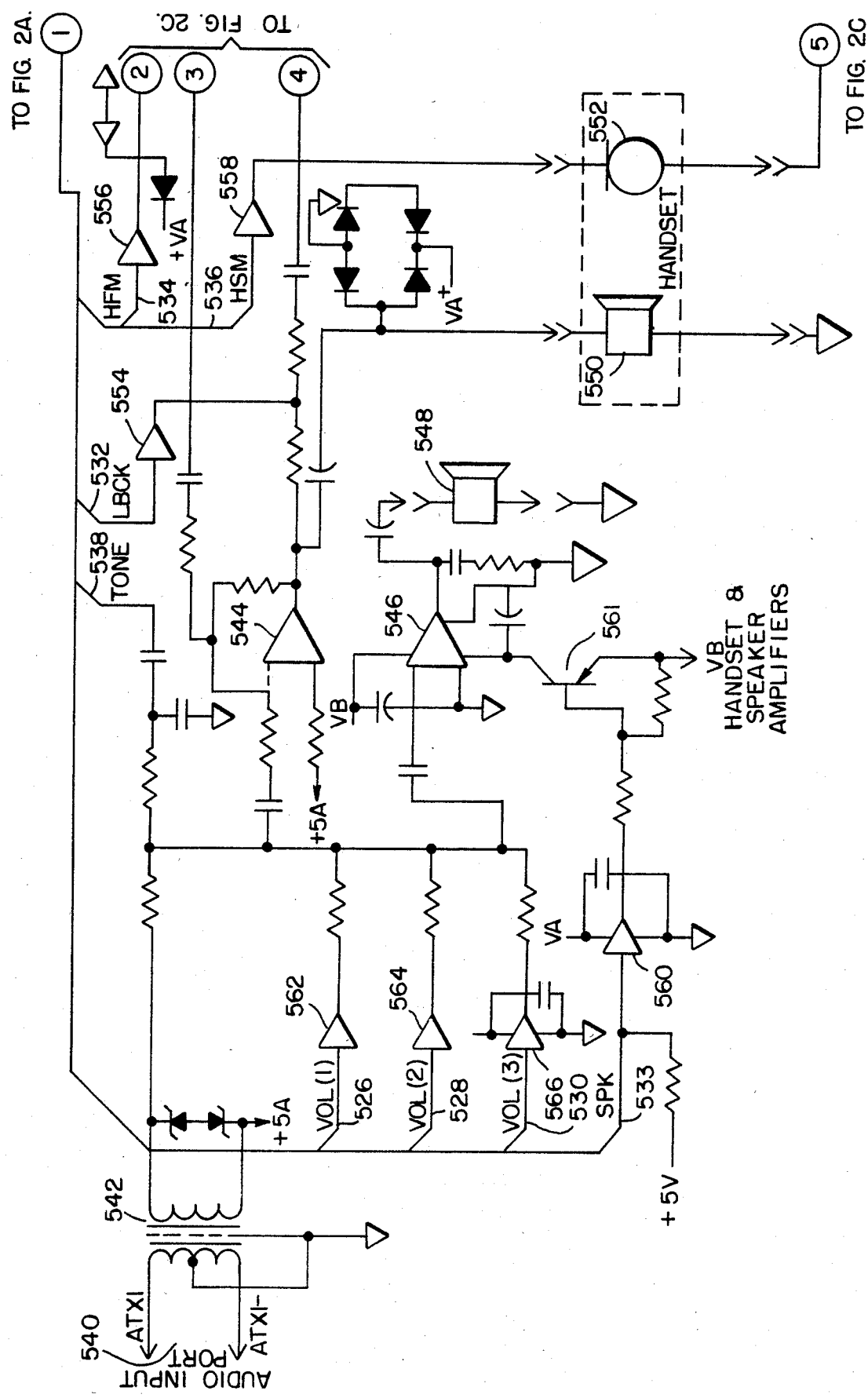
FIGS. 2B and 2C are a schematic diagram of the audio circuitry within a telephone in accordance with the present invention.
Figure 2C:
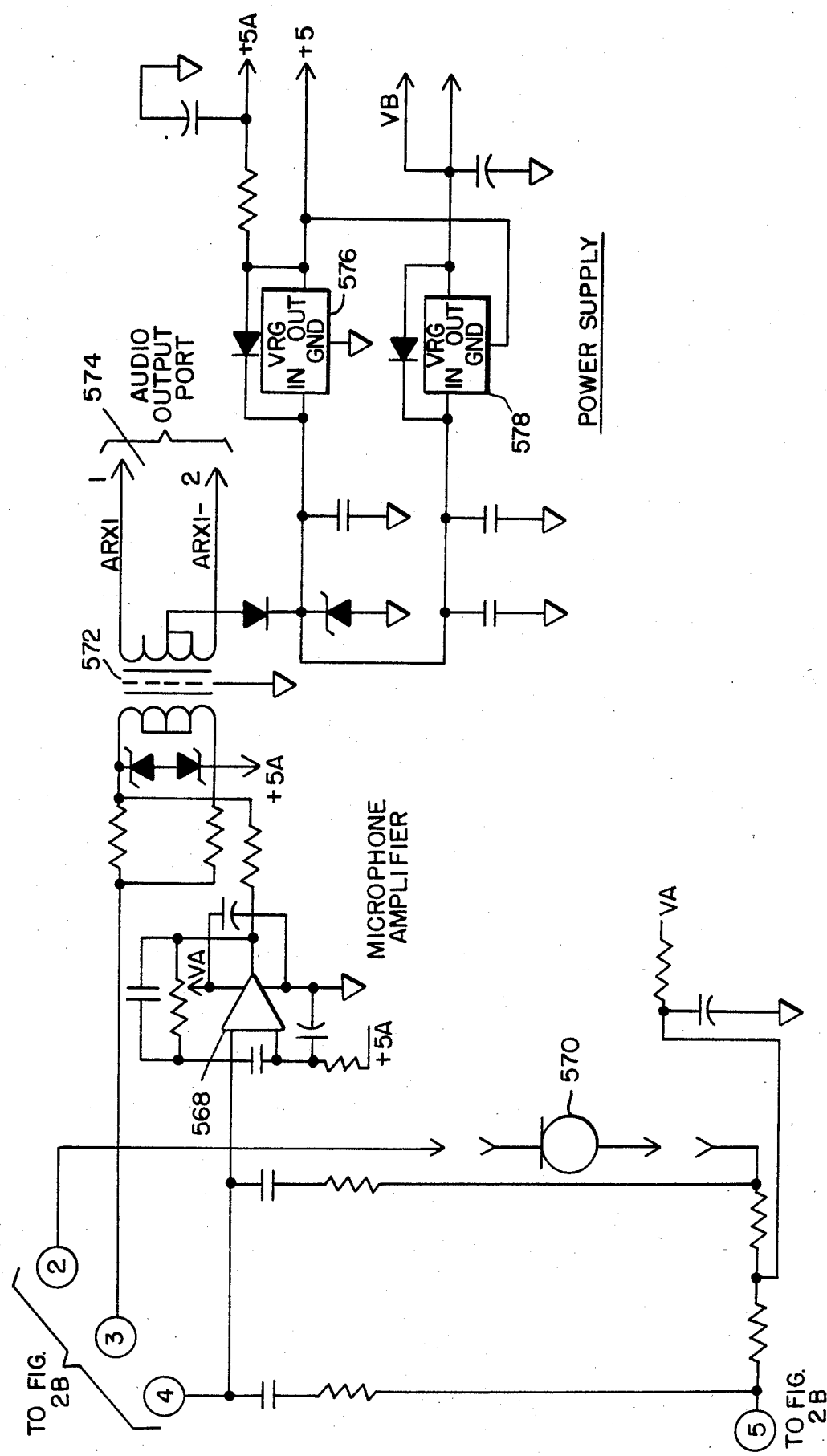
Figure 2B:
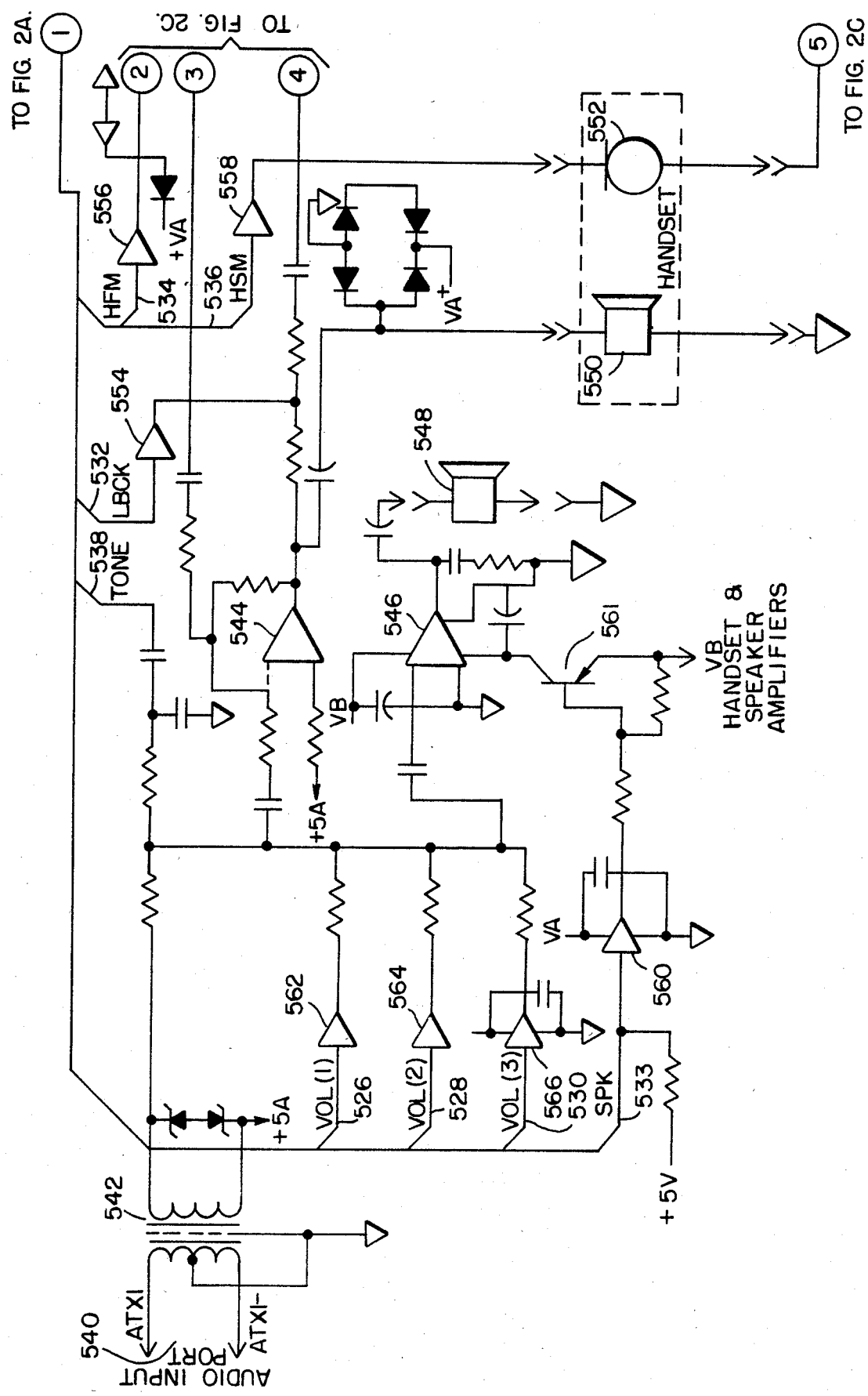
Figure 5:
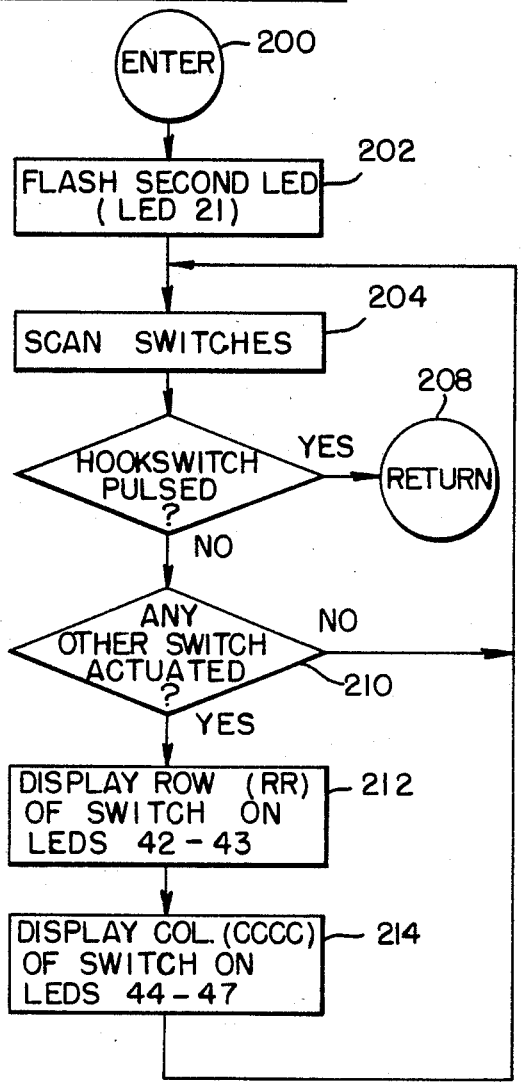
FIG. 5 is a flow chart of the SWITCH TEST (test 2) routine which can be called by the main loop.

FIGS. 2A, 2B, and 2C show the circuitry which is contained in the telephone of the present invention. FIG. 2A is a block diagram of the digital circuitry which handles data flow. The telephone includes a microprocessor 502 which executes all commands passed thereto by the KSU to which the telephone is connected. Microprocessor 502 replies to the KSU circuitry as to the status of each key (i.e., switch) in the telephone. Such keys include the telephone keyboard 13 used for dialing telephone numbers, as well as various keys 66–93 which are used to initiate features of the key telephone system. As discussed above, each of the feature switches has an LED indicator associated therewith, to provide feedback to the telephone user that a switch has been acutated and/or a function is selected.

In a preferred embodiment, the switches in the telephone are arranged in a matrix, and the status of each switch is determined by telephone microprocessor 502 by scanning the matrix in a conventional manner. Data from telephone microprocessor 502 travels on data bus 504 to a switch scan and LED drive decoder 508. A strobe signal from telephone microprocessor 502 is coupled to switch scan and LED drive decoder 508 via line 506. The switches and LED indicators 514 of the telephone are scanned by switch scan and LED drive decoder 508 via switch scan lines 510. An LED drive signal from decoder 508 is coupled to the LED indicators via lines 512. During the switch scan process, the switch data is detected by telephone microprocessor 502 on the basis of data returned over switch status lines 516.

Telephone microprocessor 502 also controls the transmission of data between the telephone and the KSU circuitry. Such data is communicated across the telephone data port 520. A transmit enable signal 522 is input from telephone microprocessor 502 to a transceiver 518. Bidirectional data line 524 couples transceiver 518 to telephone microprocessor 502. The input/output bus port of transceiver 518 carries data signals designated DX1+ and DX1− to the KSU circuitry.

Telephone microprocessor 502 is connected to the audio circuitry of the telephone via lines 526, 528, 530, 532, 533, 534, 536, and 538. Each of these lines is coupled, as shown in FIG. 2B, to control a function of the audio circuitry.

Referring now to FIGS. 2B and 2C, an audio signal to be received by the telphone station is communicated through audio input port 540. Signals ATX1 and ATX1− the KSU circuitry are coupled to transformer 542, which transfers the audio signal to the input of various amplifiers. One such amplifier is handset amplifier 544, which drives speaker 550 located in the handset 14 of the telephone. Another such amplifier is speaker amplifier 546, which drives hands free speaker 548 located in the housing 12 of the telephone. The provision of speaker 548 enables a telephone user to receive an audio signal without having to pick up the telephone handset 14. The volume of the sound from speakers 550 and 548 can be controlled by a user, by actuating appropriate switches in the telephone. The actuation of such switches will be detected by microprocessor 502 which, in turn, will output appropriate volume signals on lines 526, 528, and 530. The volume signals are coupled through buffers 562, 564 and 566 to the input circuitry of amplifiers 544 and 546. Speaker 548 can be turned on or off by telephone microprocessor 502 via line 533. The speaker on/off signal, designated SPK, is coupled through buffer 560 to a transistor 561 that controls amplifier 546.

Other features controlled by telephone microprocessor 502 include a loopback "LBCK" signal for use in testing the audio circuitry of the telephone station, and a signal for generating an audible signalling tone "TONE" which is output from either handset speaker 550 or the hands free speaker 548.

Telephone microprocessor 502 also controls the use of a handset microphone 552 or hands free microphone 570. When the handset microphone is to be used, a signal designated HSM is coupled to handset microphone 552 through buffer 558. When the hands free microphone 570 is to be used, a signal designated "HFM" is coupled thereto through buffer 556.

The output of either handset microphone 552 or hands free microphone 570 is coupled to microphone amplifier 568. The audio output from microphone amplifier 568 is coupled to transformer 572 which connects the telephone, through audio output port 574, to the KSU circuitry. The audio output signals from the telephone station are designated ARX1 and ARX1−.

Power for the telephone station is received from the same lines that couple the audio signals from audio output port 574 to the KSU circuitry. Voltage regulators 576 and 578 are provided to produce the various voltages needed by the telephone circuitry.

The present invention is concerned with the testing of telephone 10. Telephone microprocessor 502 contains software for performing various test routines which can be accessed and executed by a trained user or a telephone system installer. A switch 580, coupled to telephone microprocessor 502, is provided for placing the telephone into a test mode of operation. When switch 580 is closed, the closure will be detected by microprocessor 502, which will respond by ceasing all communication with the key telephone system KSU. At the same time, microprocessor 502 will commence execution of the built-in test software. Such software can, for example, comprise a main loop and a variety of test routines accessed by the main loop as indicated in the flow charts of FIGS. 3 through 10.

FIG. 3 is a flow chart showing a main loop which can be used in implementing a test mode of telephone operation in accordance with the present invention. The main loop, which is entered at box 100, proceeds to box 102 where a determination is made as to whether test switch 580 is closed. If the switch is not closed, the routine ends at box 104. An instance where the main loop would be entered and immediately ended via box 104 would be where test switch 580 is only momentarily closed (e.g. by mistake). The initial closure of switch 580 would cause the main loop of FIG. 3 to be entered, but the routine would find out at box 102 that the switch was immediately opened, causing the main loop to be exited at box 104.

Assuming test switch 580 is still closed when the main loop of FIG. 3 gets to box 102, control will pass to box 106 and the test mode of operation will be formally entered. A test counter "N" will be initialized by setting it to the value "1". Control then passes to box 108, where test N is called. Since N has been set to the value "1", test 1, shown in FIG. 4, will be called. This test, designated "LED TEST", verifies proper operation of each of the indicator lamps 20 to 47 of telephone 10. The routine is entered at box 120, which passes control to box 122 where the first LED (LED 20 shown in FIG. 1) is flashed on and off. Flashing LED 20 serves two functions; first, it indicates that the telephone is in the indicator lamp test routine and second, it verifies that LED 20 is operating properly.

From box 122 in FIG. 4, control passes to box 124 where all of the switches 50–93, together with hook switch 15 are scanned. Switch scanning is handled in a conventional manner as described above in connection with the circuitry shown in FIG. 2B, and particularly switch scan and LED drive decoder 508. The switches referred to in box 514 of FIG. 2B include each of switches 50 through 93 and hook switch 15. If hook switch 15 is pulsed by a user testing telephone 10, such action will be detected at box 126 of FIG. 4 and control will be passed to box 128 which returns control back to the main loop. Upon such return, control in the main loop of FIG. 3 will pass to box 110, and all of the LEDs or indicator lights 20 to 47 of telephone 10 will be turned off. From box 110, control passes to box 112 which again determines whether test switch 580 remains closed. If not, the test mode of operation is ended at box 114. Otherwise, the test counter "N" is incremented by one at box 116 and control passes back to box 108 so that the next test can be called.

If, during test 1 shown in FIG. 4, the hook switch was not pulsed during the test, control will pass to box 130. Those skilled in the art will appreciate that pulsing the hook switch enables a user to get out of a particular test routine and return to the main loop, for example, when the user has finished completing the current test. Returning to box 130, a determination will be made as to whether any other switch of telephone 10 (i.e., switches 50–93) have been actuated. If not, control returns to box 124 and the switches will continue to be scanned until some switch is actuated. If, at box 130, it is determined that a switch (other than the hook switch) has been actuated, control will pass to box 132 and the LED currently flashing will be turned off. At box 134, a determination is made as to whether the LED just turned off was the last LED in the series of LEDs to be tested (i.e., LED 47). If so, control returns to box 122 and the test repeats, commencing with LED 20. If, at box 134, it is determined that the LED just turned off was not the last LED in sequence on the telephone, control passes to box 136 where the next consecutive LED is flashed. From box 136, control passes to box 124 and the routine continues, scanning switches and incrementing to the next LED upon actuation of any switch other than the hook switch. Thus, when the LED TEST of FIG. 4 is entered, a user can test the operation of each LED on the telephone, one at a time, by successively actuating any switch on the telephone other than the hook switch. When the user is satisfied that all LEDs are operating properly, he merely actuates the hook switch to return operation back to the main loop of FIG. 3.

Upon exiting test 1, the main loop of FIG. 3 will increment the system to test 2, which is the "SWITCH TEST". Test 2 is entered at box 200, from which control passes to box 202 where the second LED (LED 21 shown in FIG. 1) is flashed on and off. This indicates to the user that test 2 is in progress. At box 204 of FIG. 5, all of the telephone switches are scanned. If, at box 206, it is determined that hook switch 15 has been pulsed, control will pass to box 208 for return to the main loop. Otherwise, all other switches are interrogated at box 210 to determine if any have been actuated. If not, control is returned to box 204 and the scanning of the switches continues. If a switch has been actuated, as determined at box 210, control will pass to box 212 where a row number designation of the actual switch actuated will be displayed on LEDs 42 and 43 of the telephone. Then, at box 214, a column designation of the actual switch actuated will be displayed on LEDs 44–47 of telephone 10. In this manner, a user can verify that a particular switch actuated is operating properly.

A group of lamps (LEDs 42–47) displays a unique multi-bit digital code upon actuation of each different switch. The display on LEDs 42–47 of the proper multi-bit code upon actuation of a switch is indicative of the proper operation of that switch.

In order to provide the unique multi-bit digital codes for use during the SWITCH TEST, each of switches 50 through 93 on telephone 10 must be assigned a unique code. Such codes will be selected by the telephone designer. One possible assignment of unique codes can be arrived at by assigning a two bit row number "RR" (for display on LEDS 42 and 43) and a four bit column number "CCCC" (for display on LEDs 44–47). A possible designation of such row and column bits is provided in the following table:

TABLE

| SWITCH REF. NUMERAL (FIG. 1) | ASSIGNED ROW NUMBER (RR) | ASSIGNED COL. NUMBER (CCCC) |
| --- | --- | --- |
| 50 | 00 | 0111 |
| 51 | 00 | 1000 |
| 52 | 00 | 1001 |
| 53 | 00 | 1010 |
| 54 | 01 | 0111 |
| 55 | 01 | 1000 |
| 56 | 01 | 1001 |
| 57 | 01 | 1010 |
| 58 | 10 | 0111 |
| 59 | 10 | 1000 |
| 60 | 10 | 1001 |
| 61 | 10 | 1010 |
| 62 | 11 | 0111 |
| 63 | 11 | 1000 |
| 64 | 11 | 1001 |
| 65 | 11 | 1010 |
| 66 | 00 | 0000 |
| 67 | 01 | 0000 |
| 68 | 10 | 0000 |
| 69 | 11 | 0000 |
| 70 | 00 | 0001 |
| 71 | 01 | 0001 |
| 72 | 10 | 0001 |
| 73 | 11 | 0001 |
| 74 | 00 | 0010 |
| 75 | 01 | 0010 |
| 76 | 10 | 0010 |
| 77 | 11 | 0010 |
| 78 | 00 | 0011 |
| 79 | 01 | 0011 |
| 80 | 10 | 0011 |
| 81 | 11 | 0011 |
| 82 | 00 | 0100 |
| 83 | 01 | 0100 |
| 84 | 10 | 0100 |
| 85 | 11 | 0100 |
| 86 | 00 | 0101 |
| 87 | 01 | 0101 |
| 88 | 10 | 0101 |
| 89 | 11 | 0101 |
| 90 | 00 | 0110 |
| 91 | 01 | 0110 |
| 92 | 10 | 0110 |
| 93 | 11 | 0110 |

Those skilled in the art will appreciate that multibit codes to designate each individual switch of the telephone can be assigned in many other formats.

Figure 6:
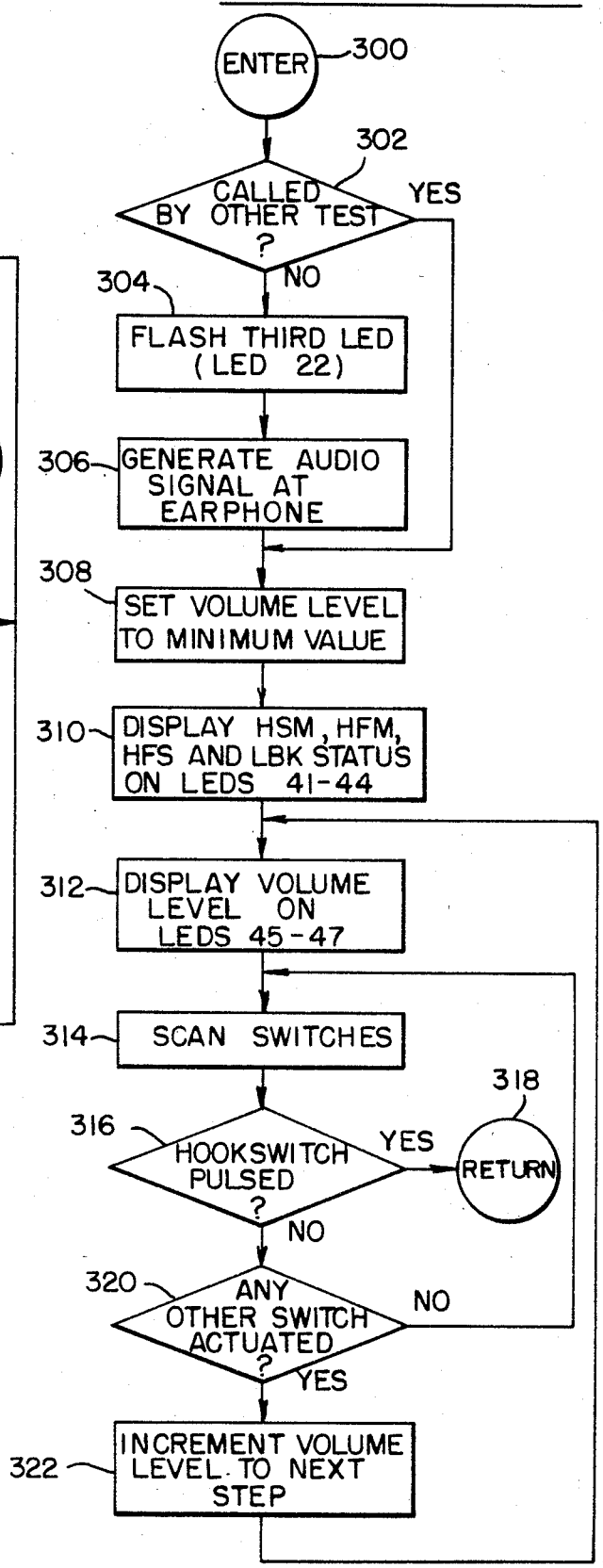
FIG. 6 is a flow chart of the EARPHONE TEST (test 3) routine which can be called by the main loop.

Once a user has completed testing all of the switches (except hook switch 15) of the telephone, hook switch 15 will be actuated to return control of the test mode from test 2 (FIG. 5) to the main loop (FIG. 3). The main loop will then increment and call test 3 (assumming test switch 580 remains closed). Test 3, for which a flow chart is provided in FIG. 6, is an "EARPHONE TEST". Upon entering the EARPHONE TEST at box 300, control is passed to box 302 which determines if this test was called by another test (i.e., not the main loop). If so, control will pass to box 308. If test 3 was called by the main loop, box 302 will pass control to box 304 and the third LED (LED 22 on telephone 10) will be flashed on and off to indicate that test 3 is in progress. Control then passes to box 306, where an audio signal is generated at the earphone which is contained in handset 14 of the telephone. At box 308, the volume level of the telephone's audio processing circuitry (FIG. 2B) is set to its minimum value via volume control lines 526, 528, and 530 (VOL (1), (2), and (3) respectively).

From box 308 of FIG. 6, control passes to box 310, which displays the status of the handset microphone, hands free microphone, hands free speaker, and loopback switch status on LEDs 41–44. Thus, if the handset microphone is on, LED 41 will be turned on. If the hands free microphone is on, LED 42 will be turned on. If the hands free speaker is on, LED 43 will be turned on. Finally, if the audio output of the telephone is coupled to the audio input, by LBCK line 532, LED 44 will be turned on indicating that the "loopback" switch is on.

From box 310, control passes to box 312 which causes the volume level of the telephone audio circuitry to be displayed on LEDs 45-47. These LEDs represent 3 bits of information, where one bit (LED 47) represents the status of the signal VOL (1) on line 526 of the audio circuitry (FIG. 2B), LED 46 represents the signal VOL (2) on line 528, and LED 45 represents the signal VOL (3) on line 530. The minimum volume level will be indicated by all three of LEDs 45-47 being off. The maximum volume level is indicated when all three of LEDs 45-47 are turned on.

Control subsequently passes to box 314, where each of switches 50-93 and hook switch 15 are scanned. If the hook switch is pulsed, this occurence is detected at box 316 and control is returned to the main loop or other calling routine at box 318. If the hook switch is not actuated, control passes from box 316 to box 310 to determine if any other switch has been actuated. If not, control is passed to box 314 and the loop continues. If another switch has been actuated, control passes to box 322 where the volume level of the telephone audio circuitry is incremented to the next step. Since the volume level "wraps around", the next step after the maximum volume level will be the minimum volume level.

Figure 7:
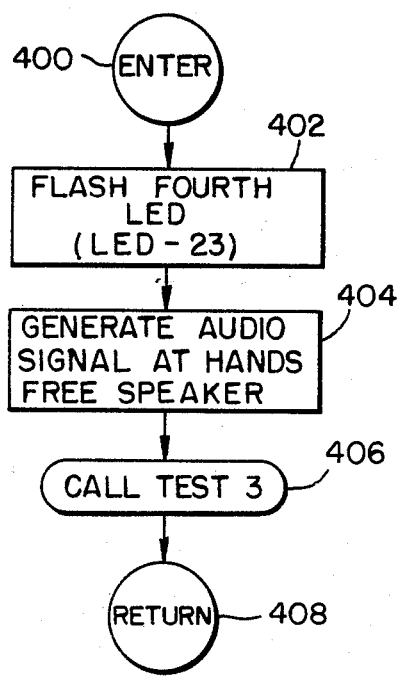
FIG. 7 is a flow chart of the HANDS-FREE SPEAKER TEST (test 4) routine which can be called by the main loop.

FIG. 7 is a flow chart illustrating a routine for testing the HANDS FREE SPEAKER of the telephone. This test is referred to as test 4. Upon entering test 4 at box 400, control passes to box 402 which causes the fourth LED (LED 23) to flash, indicating that test 4 is in progress. At box 404, an audio signal is generated at the hands free speaker 548. Then, at box 406, test 3 is called for control of the volume level and display of the handset microphone, hands free microphone, hands free speaker, loopback switch, and volume level status. At the conclusion of test 4, a user will pulse hook switch 15. This action will cause test 3 to return control to test 4, which in turn returns control to the main loop via box 408.

Figure 8:
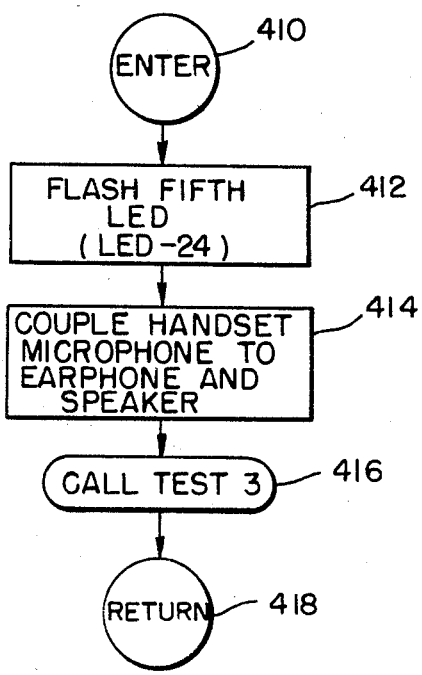
FIG. 8 is a flow chart of the HANDSET MICROPHONE TEST (test 5) routine which can be called by the main loop.

FIG. 8 shows the HANDSET MICROPHONE test routine, referred to as test 5. The routine is entered at box 410, which passes control to box 412 for flashing of the fifth LED (LED 24) indicating that test 5 is in progress. At box 414, the handset microphone 552 is coupled to the earphone 550 in handset 14 and the hands free speaker 548. Then, at box 416, test 3 is called for volume level control and status display. When test 5 is complete, control is returned to the main loop via box 418.

Figure 9:
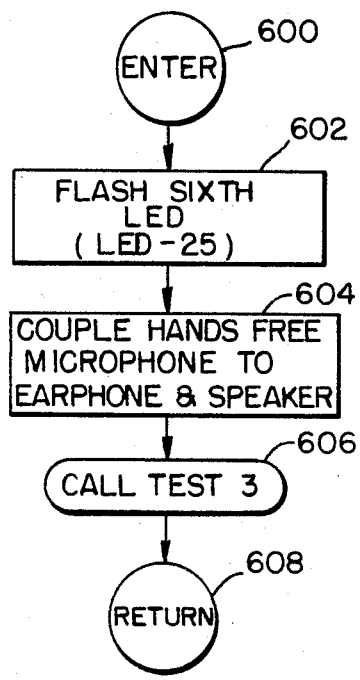
FIG. 9 is a flow chart of the HANDS-FREE MICROPHONE TEST (test 6) routine which can be called by the main loop.

FIG. 9 is a flow chart depicting a routine for testing the HANDS FREE MICROPHONE referred to as test 6. After entry to the routine at box 600, box 602 causes the sixth LED (LED 25) to flash on and off, indicating that test 6 is in progress. At box 604, the hands free microphone 570 is coupled to the handset earphone 550 and hands free speaker 548. Then, test 3 is called for volume level control and status display. Upon completion of test 6, control is returned to the main loop via box 608.

Figure 10:
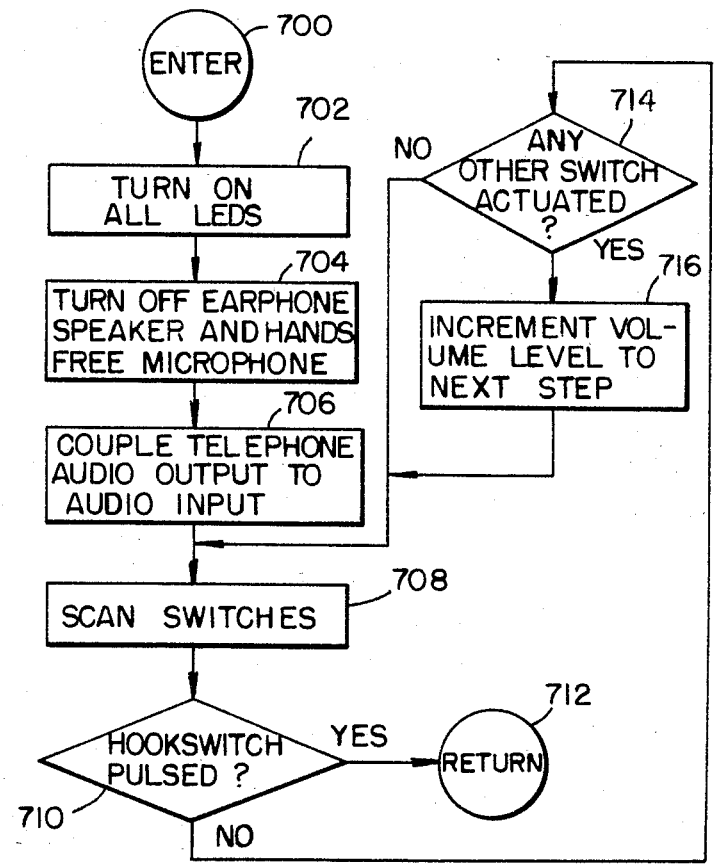
FIG. 10 is a flow chart of the NOISE AND LOOP-BACK TEST (test 7) routine which can be called by the main loop.

The flow chart of FIG. 10 depicts a routine for testing the NOISE inherent in the telephone's audio circuitry and also tests the LOOPBACK switch. The routine is entered at box 700, which passes control to box 702 to turn on every one of LEDs 20-47. Control then passes to box 704, where the earphone 550, hands free speaker 548, and hands free microphone 570 are turned on. By turning on all of the components designated in boxes 702 and 704, the telephone's power supply is placed under a maximum load condition. Then, at box 706, the loopback switch is actuated, coupling the telephone's audio output to its audio input. The loopback switch is controlled by the signal "LBCK" from telephone microprocessor 502 on line 532.

Once the telephone power supply is under maximum load, and the loopback switch is on, noise measurements may be made at earphone 550 or hands free speaker 548 in a conventional manner. It is noted that an oscillation may be heard through both the earphone 550 and the hands free speaker 548 when the loopback switch is on. If this occurs, the user is instructed to replace hands free microphone 552 with a 1000 ohm resistor. This will terminate the oscillation, allowing the noise measurement to be made.

At box 708 in FIG. 10, the switches of the telephone are scanned. If hook switch 15 is pulsed, as determined at box 710, test 7 will be exited and return will be passed to the main loop via box 712. Otherwise, it will be determined at box 714 whether any other switch has been actuated. If not, control is returned to box 708 and the loop continues. If a switch other than the hook switch has been actuated, the volume level of the telephone audio circuitry will be incremented to the next step at box 716. Then, the loop will continue via box 708.

Testing can continue in this manner until the test switch 580 is opened. Any opening of test switch 580 will be detected by the main loop, and the test mode of telephone operation will be terminated. Upon termination of the test mode of operation, the telephone will automatically be coupled back into the KSU and placed back into service.

It should now be appreciated that the present invention provides a telephone having built-in test capabilities which can be easily accessed by a relatively unsophisticated user for testing the telephone. Other than a test switch for placing the telephone into its test mode of operation, no additional components are required to enable the user to interface with the test routines. The structure of the present invention takes advantage of the switches and indicator lamps already present on the telephone. The indicator lamps used during the normal operation of the telephone are used during the test mode of operation to provide visual indications that components of the telephone are operating properly.

A copy of the software for the test mode of operation of the telephone of the present invention is attached hereto and made a part hereof as an appendix. The software code is designed to run on an 8048 microprocessor, which can be used for microprocessor 502 shown in FIG. 2A.

Although the present invention has been described in connection with a preferred embodiment thereof, many variations and modifications could be made. It is intended to cover all of the variations and modifications which fall within the scope of the present invention, as recited in the following claims.

| | | | | | | | | | | | | | | | | |
|---|---|---|---|---|---|---|---|---|---|---|---|---|---|---|---|---|
| (0000) | 04 | 27 | 00 | 64 | 22 | 00 | 00 | 64 | 23 | 86 | 22 | 86 | 11 | 88 | 10 | 55 |
| (0010) | 10 | 44 | 10 | 33 | 10 | 22 | 10 | 76 | 29 | A9 | 4C | 98 | 4C | 87 | 4C | 76 |
| (0020) | 4C | 65 | 4C | 54 | 4C | 43 | 4C | 15 | 35 | 99 | 5F | 89 | 40 | 27 | B7 | E5 |

-continued

| | | | | | | | | | | | | | | | | |
|---|---|---|---|---|---|---|---|---|---|---|---|---|---|---|---|---|
| (0030) | C5 | B9 | 2C | B8 | 14 | 54 | 09 | D5 | BA | 68 | BD | 80 | BE | 28 | C5 | 85 |
| (0040) | A5 | B8 | 38 | B0 | 70 | B8 | 35 | B0 | 0F | BB | 0D | B8 | 21 | B9 | 06 | 23 |
| (0050) | FF | 54 | 09 | B8 | 13 | A0 | B8 | 3B | B9 | 05 | 54 | 09 | 74 | 23 | 25 | 05 |
| (0060) | FB | 53 | 0F | D3 | 0D | 96 | CD | B8 | 36 | F0 | 53 | 07 | AA | B8 | 38 | F0 |
| (0070) | 53 | F8 | 4A | B8 | 15 | 40 | B8 | 39 | F0 | AA | B8 | 36 | D0 | C6 | 9D | FA |
| (0080) | A0 | B8 | 1D | B0 | 80 | 53 | F0 | C6 | CD | 47 | E7 | 03 | 08 | AA | B8 | 16 |
| (0090) | A3 | A0 | 18 | CA | FA | A3 | A0 | 74 | 14 | B8 | 1D | B0 | 0A | B8 | 1D | F0 |
| (00A0) | F2 | CD | B8 | 16 | F0 | C6 | CD | B8 | 14 | F0 | 96 | CD | B8 | 1C | F0 | 96 |
| (00B0) | B6 | B8 | 17 | F0 | 04 | CB | B8 | 16 | F0 | 47 | 53 | 0F | C6 | C1 | 27 | 04 |
| (00C0) | CB | B8 | 17 | F0 | C6 | CD | B0 | 80 | 27 | C8 | A0 | 74 | 14 | FB | 53 | 0C |
| (00D0) | D3 | 0C | C6 | FB | 54 | 00 | FB | 53 | 0F | 54 | 02 | 09 | 53 | 0F | AC | 09 |
| (00E0) | 53 | 0F | DC | 96 | DB | 54 | 00 | B8 | 35 | F0 | 54 | 02 | FB | 53 | 0E | 77 |
| (00F0) | 03 | 21 | A8 | AA | F0 | A9 | FB | 53 | 01 | 24 | 39 | 24 | 91 | 00 | 00 | 00 |
| (0100) | FA | FA | 3A | 3A | FA | FA | 3A | 2A | EA | EA | 2E | 2E | EE | EE | 3E | 3E |
| (0110) | FE | DE | 1E | 1E | 76 | 66 | 26 | 26 | 66 | 66 | 26 | 26 | 76 | 76 | 36 | 36 |
| (0120) | 76 | 76 | 26 | 26 | 66 | 46 | 06 | 06 | 17 | AA | 23 | 80 | E7 | EA | 2C | AA |
| (0130) | 83 | F0 | 47 | 53 | F0 | 4C | 47 | 24 | 50 | C6 | 3F | F9 | 47 | 24 | 40 | F9 |
| (0140) | 53 | 0F | A9 | DC | C6 | 91 | AD | FA | A8 | FB | 12 | 31 | F0 | 53 | F0 | 4C |
| (0150) | A0 | BA | 04 | B9 | 08 | FD | 59 | C6 | 85 | 5C | C6 | 8D | FA | 07 | 43 | 04 |
| (0160) | 47 | AE | FB | 53 | 0F | 4E | 2E | B8 | 40 | C8 | F8 | D3 | 3A | C6 | 77 | F0 |
| (0170) | F2 | FC | F8 | D3 | 3F | C6 | 83 | 18 | FE | A0 | 24 | 85 | F8 | D3 | 3B | C6 |
| (0180) | 78 | 24 | 69 | B0 | 0B | F9 | 97 | 67 | A9 | EA | 55 | 24 | 91 | FA | 07 | 24 |
| (0190) | 60 | FB | 12 | E4 | 53 | 0E | 03 | 28 | A8 | B9 | 1E | F1 | 07 | 03 | 00 | A3 |
| (01A0) | A9 | BD | 04 | BC | 00 | F0 | 47 | 53 | 0F | 34 | 28 | 52 | C1 | FA | 59 | C6 |
| (01B0) | B7 | FD | 07 | 34 | 28 | 4C | 2C | FD | 53 | 04 | C6 | C8 | F0 | C8 | CD | 24 |
| (01C0) | A7 | FB | 53 | 30 | C6 | AD | 24 | B1 | CD | FD | C6 | D3 | D3 | 02 | C6 | A5 |
| (01D0) | F0 | 24 | A7 | FC | 47 | AC | FB | 53 | 0E | 97 | 67 | 4C | B8 | 35 | A0 | 54 |
| (01E0) | 00 | F0 | 54 | 02 | FB | 53 | 0F | 96 | F7 | FB | 43 | 0D | 2B | 43 | 0D | AC |
| (01F0) | DB | C6 | F5 | FC | AB | 44 | 0E | CB | 44 | 0E | 23 | FF | 20 | AA | 17 | 83 |
| (0200) | 23 | 0F | 02 | 89 | 20 | 99 | 4F | 83 | 27 | A0 | 18 | E9 | 09 | 83 | B8 | 37 |
| (0210) | 34 | FA | C6 | 28 | FA | 53 | 1F | 77 | 03 | 27 | A8 | 97 | FA | 53 | E1 | 67 |
| (0220) | 2A | F0 | E6 | 2A | 53 | 0F | 4A | A0 | 44 | 31 | 53 | F0 | 47 | 4A | 47 | 44 |
| (0230) | 27 | B8 | 3A | 34 | FA | C6 | 44 | 54 | 00 | FA | 02 | 89 | 10 | 99 | EF | B8 |
| (0240) | 35 | F0 | 54 | 02 | 56 | 7D | B8 | 20 | F0 | AA | B9 | 3B | F1 | AC | F2 | 7B |
| (0250) | 23 | 0B | DC | 96 | 83 | 1A | 23 | 07 | DA | 96 | 5C | AA | FA | A0 | FA | E7 |
| (0260) | 6A | 03 | D3 | A8 | B9 | 37 | BC | 03 | F8 | A3 | A1 | 18 | 19 | EC | 68 | FA |
| (0270) | B8 | 27 | B9 | 0E | B3 | 06 | C6 | 7F | 27 | 54 | 09 | 74 | 6E | 04 | 60 | 23 |
| (0280) | 11 | 44 | 79 | FC | B2 | 7B | 23 | 8A | 6A | B3 | 91 | B0 | B4 | B4 | B4 | B4 |
| (0290) | B4 | B8 | 27 | B9 | 0E | F0 | C6 | A7 | AD | 53 | 0F | 96 | AC | A0 | 18 | E9 |
| (02A0) | A3 | B8 | 27 | B0 | 01 | 44 | 7B | 18 | E9 | 95 | 44 | 55 | B0 | 10 | 44 | 7B |
| (02B0) | 54 | E8 | 44 | 7B | B8 | 38 | 54 | C3 | B8 | 39 | 54 | C3 | FA | D3 | 06 | 96 |
| (02C0) | B0 | 44 | 7B | F0 | 53 | 7F | AC | 53 | 07 | 17 | 53 | 07 | 2C | 53 | F8 | 4C |
| (02D0) | AC | A0 | 83 | 80 | 70 | 00 | 81 | 70 | 00 | 82 | 70 | 20 | 83 | 60 | 20 | 84 |
| (02E0) | 20 | 00 | 85 | 50 | 00 | 26 | 78 | 00 | B8 | 31 | B9 | 04 | 54 | 08 | B8 | 34 |
| (02F0) | 17 | 96 | F4 | 83 | B9 | 00 | BD | 02 | 64 | 00 | 00 | 00 | 00 | 00 | 00 | 00 |
| (0300) | FC | 97 | 67 | AC | F9 | E6 | 09 | 43 | 01 | 47 | A9 | ED | 00 | F9 | 47 | A0 |
| (0310) | C8 | FC | 44 | F1 | B8 | 1C | A0 | B8 | 16 | F0 | 47 | A0 | 53 | 0F | B8 | 14 |
| (0320) | A0 | 83 | 93 | D5 | AF | B9 | 38 | 23 | FE | 62 | 55 | EA | 4A | BA | 68 | EE |
| (0330) | 39 | BE | 28 | B8 | 03 | F0 | 03 | 10 | A0 | FD | F2 | 5F | FC | 47 | AC | ED |
| (0340) | 4A | BD | 0A | B8 | 14 | F0 | C6 | 4A | 07 | A0 | FD | F2 | 5F | FC | C6 | 5F |
| (0350) | B9 | 15 | EB | 5F | B5 | 53 | 0F | 97 | 67 | AB | 76 | 5F | 13 | 00 | AB | F1 |
| (0360) | 76 | 6A | 53 | 7F | 3A | FF | C5 | 99 | 7F | 93 | 43 | 80 | 64 | 64 | B8 | 3B |
| (0370) | B9 | 3C | B0 | FF | F1 | 17 | C6 | 7D | 07 | A0 | B1 | FF | 18 | 19 | F9 | D3 |
| (0380) | 40 | 96 | 74 | 83 | 00 | 00 | 00 | 00 | 00 | 00 | 00 | 00 | 00 | 00 | 00 | 00 |
| (0390) | 00 | 00 | 00 | 00 | 00 | 00 | 00 | 00 | 00 | 00 | 00 | 00 | 00 | 00 | 00 | 00 |
| (03A0) | 00 | 00 | 00 | 00 | 00 | 00 | 00 | 00 | 00 | 00 | 00 | 00 | 00 | 00 | 00 | 00 |
| (03B0) | 00 | 00 | 00 | 00 | 00 | 00 | 00 | 00 | 00 | 00 | 00 | 00 | 00 | 00 | 00 | 00 |
| (03C0) | 00 | 00 | 00 | 00 | 00 | 00 | 00 | 00 | 00 | 00 | 00 | 00 | 00 | 00 | 00 | 00 |
| (03D0) | 00 | 00 | 00 | 00 | 00 | 00 | 00 | 00 | 00 | 00 | 00 | 00 | 00 | 00 | 00 | 00 |
| (03E0) | 00 | 00 | 00 | 00 | 00 | 00 | 00 | 00 | 00 | 00 | 00 | 00 | 00 | 00 | 00 | 00 |
| (03F0) | 00 | 00 | 00 | 00 | 00 | 00 | 00 | 00 | 00 | 00 | 00 | 00 | 00 | 00 | 00 | 00 |

END OF LISTING.

What is claimed is:

1. A telephone having built-in test capability, for use in a key telephone system, comprising:
   a telephone housing;
   a microprocessor mounted in said housing;
   a plurality of switches mounted to said housing and coupled to said microprocessor for placing calls and implementing features associated with said key telephone system;
   a plurality of indicator lamps mounted to said housing and coupled to said microprocessor, each lamp associated with one of said switches;
   means coupled to said microprocessor for placing said telephone into a test mode of operation; and
   means operatively associated with said microprocessor and responsive to said switches during said test mode for stepping through and conducting a plurality of district functional telephone self-tests to determine if different components of the telephone are operating properly.

2. The telephone of claim 1 further comprising means for driving a group of said lamps during one of said tests to display a unique multi-bit digital code upon actuation of each different switch, whereby the display of the proper multi-bit code upon actuation of a switch is indicative of the proper operation of that switch.

3. The telephone of claim 1 further comprising a handset having an earphone and a handset microphone;
   means for generating an audible signal during one of said tests for testing said earphone; and means for coupling said audible signal to said earphone to verify the operation of the earphone.

4. The telephone of claim 3 further comprising means for driving said lamps to display a unique code indicating that said earphone test is in progress.

5. The telephone of claim 3 wherein one of said tests is a handset microphone test; and further comprising
means for coupling the output of said handset microphone to the input of said earphone during said handset microphone test to verify operation of the microphone when an audible signal introduced into the microphone is reproduced by the earphone.

6. The telephone of claim 5 further comprising means for driving said lamps to display a unique code indicating that said handset microphone test is in progress.

7. The telephone of claim 6 further comprising means for driving said lamps to display a unique code indicating whether said handset microphone is turned on or off.

8. The telephone of claim 1 wherein one of said tests is an indicator lamp test and further comprising
means for sequentially lighting said indicator lamps during said lamp test, one at a time, in response to successive actuations of at least one of said switches.

9. The telephone of claim 8 further comprising means for driving said lamps to display a unique code indicating that said lamp test is in progress.

10. The telephone of claim 1 further comprising a hands free speaker mounted to said housing;
means for generating an audible signal during one of said tests for testing said hands free speaker; and
means for coupling said audible signal to said hands free speaker to verify the operation of the speaker.

11. The telephone of claim 10 further comprising means for driving said lamps to display a unique code indicating that said hands free speaker test is in progress.

12. The telephone of claim 10 further comprising means for driving said lamps to display a unique code indicating whether said hands free speaker is turned on or off.

13. The telephone of claim 1 further comprising an audio output transducer and a hands free microphone mounted to said housing; and
means for coupling the output of said hands free microphone to the input of said audio output transducer during one of said tests for testing said hands free microphone to verify operation of the microphone when an audible signal introduced into the microphone is reproduced by said audio output transducer.

14. The telephone of claim 13 further comprising means for driving said lamps to display a unique code indicating that said hands free microphone test is in progress.

15. The telephone of claim 14 further comprising means for driving said lamps to display a unique code indicating whether said hands free microphone is turned on or off.

16. A telephone for use in a key telephone system, said telephone comprising:
a housing;
audio processing circuitry mounted in said housing;
a handset containing an earphone and microphone coupled to said audio processing circuitry;
a plurality of switches mounted to said housing, including a keyboard for dialing outside calls and function switches for implementing features available in the key telephone system;
a plurality of indicator lamps adapted to indicate the status of features implemented by said function switches during the normal operation of said telephone;
a microprocessor;
means for coupling said microprocessor to said switches and indicator lamps;
means for entering said microprocessor, and hence said telephone, into a telephone test mode of operation;
means for individually accessing each of a plurality of telephone self-tests available during said telephone test mode to test the operation of a corresponding portion of said telephone; and
means for providing a visual indication on said indicator lamps to identify which one of said tests has been accessed.

17. The telephone of claim 16 wherein one of said tests is an indicator lamp test for verifying the proper operation of each of said lamps, said telephone further comprising means associated with said microprocessor for turning on said lamps in response to actuations of said switches.

18. The telephone of claim 17 wherein one of said tests is a key test for verifying the proper operation of each of said switches, said telephone further comprising means associated with said microprocessor for driving a group of said indicator lamps to display a unique multi-bit digital code upon actuation of each different switch, whereby the display of the proper multi-bit code upon actuation of a switch is indicative of the proper operation of that switch.

19. The telephone of claim 18 wherein one of said tests is an earphone test for verifying the proper operation of said earphone, said telephone further comprising means for generating an audible signal and means for coupling the audible signal to said earphone, whereby the output of said audible signal from said earphone is indicative of the proper operation of the earphone.

20. The telephone of claim 19 wherein one of said tests is a microphone test for verifying the proper operation of said microphone, said telephone further comprising means for coupling an audio output from said microphone to said earphone, whereby the reproduction of said audio output by said earphone is indicative of the proper operation of the microphone.

21. The telephone of claim 20 further comprising a hands free speaker mounted in said housing, wherein one of said tests is a hands free speaker test for verifying the proper operation of said speaker, said telephone further comprising means for coupling said audible signal to said speaker during said hands free speaker test, whereby the output of said audible signal from said speaker is indicative of the proper operation of the speaker.

22. The telephone of claim 21 further comprising a hands free microphone mounted in said housing, wherein one of said tests is a hands free microphone test for verifying the proper operation of said hands free microphone, said telephone further comprising means for coupling an audio output from said hands free microphone to an audio output transducer, whereby the reproduction of said audio output by said transducer is indicative of the proper operation of the hands free microphone.

23. The telephone of claim 22 wherein one of said tests is a noise test for determining the audio quality of the telephone, said telephone further comprising means for coupling the output of said hands free microphone to the inputs of said earphone and speaker during said noise test, whereby the audio output of said earphone and said speaker can be measured to ascertain the noise inherent in the telephone's audio processing circuitry.

* * * * *